(12) United States Patent
Banavar et al.

(10) Patent No.: US 6,662,206 B1
(45) Date of Patent: Dec. 9, 2003

(54) METHOD AND APPARATUS FOR SUMMARIZING MISSING EVENTS USING EVENT STREAM INTERPRETATION

(75) Inventors: Guruduth S. Banavar, Yorktown Heights, NY (US); Robert E. Strom, Ridgefield, CT (US); Daniel C. Sturman, Englewood, NJ (US); Wei Tao, Salt Lake City, UT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/322,205

(22) Filed: May 28, 1999

(51) Int. Cl.$^7$ ............................................. G06F 15/16
(52) U.S. Cl. ..................................... 709/201; 709/207
(58) Field of Search ................................. 709/201, 224, 709/216, 203, 226, 202, 206, 207, 232; 707/9, 530; 705/35, 14; 706/11, 47; 703/4, 6; 348/88; 710/11; 717/1, 168; 380/271

(56) References Cited

U.S. PATENT DOCUMENTS

| | | | | |
|---|---|---|---|---|
| 5,627,764 A | * | 5/1997 | Schutzman et al. | 709/207 |
| 5,717,951 A | * | 2/1998 | Yabumoto | 710/11 |
| 5,719,918 A | * | 2/1998 | Serbetciouglu et al. | 380/271 |
| 5,802,253 A | * | 9/1998 | Gross et al. | 706/47 |
| 5,815,198 A | * | 9/1998 | Vachtsevanos et al. | 348/88 |
| 5,815,415 A | * | 9/1998 | Bentley et al. | 703/4 |
| 5,835,711 A | * | 11/1998 | Chang et al. | 709/232 |
| 6,105,027 A | * | 8/2000 | Schneider et al. | 707/9 |
| 6,154,765 A | * | 11/2000 | Hart | 709/201 |
| 6,230,184 B1 | * | 5/2001 | White et al. | 709/201 |
| 6,272,672 B1 | * | 8/2001 | Conway | 717/1 |
| 6,408,291 B1 | * | 6/2002 | Skeen et al. | 707/2 |

OTHER PUBLICATIONS

Samani et al, A Configurable Event Sertvice for Distributed Systems, IEEE 1996.*
Samani et al, A Configurable Event Sertvice for Distributed Systems, IEEE 1996.*
Gondran, et al., Graphs and Algorithms, John Wiley & Sons, 1986, pp. 45–45, 78–79.

* cited by examiner

*Primary Examiner*—Mark R. Powell
*Assistant Examiner*—Thong Vu
(74) *Attorney, Agent, or Firm*—Douglas W. Cameron, Esq.; Kevin M. Jordan, Esq.; Heslin Rothenberg Farley & Mesiti P.C.

(57) ABSTRACT

A technique for optimizing published event message sequences destined for information subscribers in an information processing system. Subscribers specify event interpretation rules which map event message streams into states. The event interpretation rules are maintained elsewhere in the system in preparation for providing optimized, possibly shorter, event message streams to subscribers, sufficient to correctly update the states. If a subscriber temporarily loses access to its event message stream, the optimized event message stream is determined using a shortest path graph search technique between the states defined by the start and end of the missing portion of the stream. Optimizations to the shortest path graph search technique are disclosed for use when the event interpretation rule is in replacement form, in which estimator functions based on extended rules are employed.

54 Claims, 8 Drawing Sheets

EVENT INTERPRETATION RULE IN REPLACEMENT FORM

|       | S1 | S2 | S3 |
|-------|----|----|----|
| e1 (a,b) | a |   | b  |
| e2 (a)   | a | a |    |
| e3 (a)   |   | a |    |

*Fig. 5*

EVENT INTERPRETATION RULE IN UNCONSTRAINED REPLACEMENT FORM

|       | S1 | S2 | S3 |
|-------|----|----|----|
| e1 (a,b) | a |   | b  |
| e2 (a,b) | a | b |    |
| e3 (a)   |   | a |    |

*Fig. 6*

EVENT INTERPRETATION RULE IN UNIFORM UNCONSTRAINED REPLACEMENT FORM

|       | S1 | S2 | S3 |
|-------|----|----|----|
| e1 (a,b) | a |   | b  |
| e2 (a,b) | a | b |    |
| e3 (a,b) |   | a | b  |

|  | ORIGINAL EVENTS | STATES <ISSUE, MAX, CUR> | DELIVERED EVENTS |
|---|---|---|---|
|  | (XYZ, 150) | <XYZ, 150, 150> | (XYZ, 150) |
|  | (XYZ, 160) | <XYZ, 160, 160> | (XYZ, 160) |
|  | (XYZ, 140) | <XYZ, 160, 140> | (XYZ, 140) |
| DISCONNECT: |  |  |  |
|  | (XYZ, 200) | <XYZ, 200, 200> |  |
|  | (XYZ, 180) | <XYZ, 200, 180> |  |
|  | ... | ... |  |
|  | (XYZ, 120) | <XYZ, 200, 120> |  |
| RECONNECT: |  |  |  |
|  |  |  | (XYZ, 200) |
|  |  |  | (XYZ, 120) |

CONSTRAINED REPLACEMENT FORM

|  | MAXPRICE | CURPRICE |
|---|---|---|
| p > MAXPRICE | p | p |
| p < = MAXPRICE |  | p |

*Fig. 11a*

UNCONSTRAINED REPLACEMENT FORM

|  | MAXPRICE | CURPRICE |
|---|---|---|
| p > MAXPRICE, q | p | q |
| p < = MAXPRICE |  | p |

*Fig. 11b*

UNIFORM UNCONSTRAINED REPLACEMENT FORM

|  | MAXPRICE | CURPRICE |
|---|---|---|
| p > MAXPRICE, q | p | q |
| p < = MAXPRICE, r | r | p |

*Fig. 11c*

METHOD AND APPARATUS FOR SUMMARIZING MISSING EVENTS USING EVENT STREAM INTERPRETATION

CROSS-REFERENCE TO RELATE APPLICATIONS

This Application relates to the commonly assigned, concurrently filed U.S. patent application Ser. No. 09/322,521, entitled "REDUCTION AND OPTIMIZATION OF INFORMATION PROCESSING SYSTEMS," Kaplan et al., filed May 28, 1999, which Application is incorporated by reference herein in its entirety.

TECHNICAL FIELD

The present invention relates to information processing systems, and in particular to techniques for the delivery of a stream of events from an information producer to an information consumer.

BACKGROUND OF THE INVENTION

Messaging middleware, by supporting general messaging and message transformation between network nodes, facilitates the integration of distributed components of a processing application. Middleware collects messages from information producers ("publishers"), filters and transforms the messages as necessary, and disseminates applicable messages to interested information consumers ("subscribers"). This type of system is known as a publish/subscribe system. Publish/subscribe middleware systems are therefore important to the inter-connection of heterogeneous and distributed components of large information networks, which rely on message communication, in domains such as finance, process automation, and transportation. In some embodiments of such systems, "events" are reduced into messages, to be provided to the subscribers as event message streams.

An exemplary publish/subscribe system may be represented by an Information Flow Graph ("IFG") as a set of information publishing nodes which emit event messages, a set of information subscribing nodes which read event messages, a set of intermediate nodes where messages coming from streams along different input arcs are interleaved into an outgoing stream of messages, i.e., a replica of the stream is sent along each outgoing arc. The nodes may be connected by arcs of at least two kinds:

Selection arcs, which "filter" messages flowing from one node to another by only passing along messages which satisfy a predicate; and Transformation arcs, which "transform" messages flowing from one node to another by adding, dropping, and/or recomputing the fields of each message.

A publish/subscribe system may include a large network or "graph" of nodes and arcs, with many possible paths from each publishing node to each subscribing node, each path comprised of possibly many selection and transformation arcs, resulting in a particular sequence of operations between each publisher/subscriber node pair.

Subscribers therefore receive information in the form of event message streams, possibly filtered with transforms and/or selects, where each event is described in a message, such as the price and volume of a new stock trade. However, a subscriber's access to its event message stream may be interrupted for a number of reasons, e.g., because the subscriber may only be intermittently connected to the network, or because a temporary link or network failure has caused an interruption in the path from the publisher of the events to the subscriber.

What is required are techniques for addressing the problem of delivering equivalent, optimized event sequences to subscribers for, e.g., effectively recovering from an interruption of a subscriber's stream of event messages, by delivering a potentially shorter sequence of messages having an equivalent effect on a subscriber's application.

SUMMARY OF THE INVENTION

When a subscriber's access to its network is resumed after a period of interruption, there is likely to be a set of missing events, i.e., the events which would have been delivered to the subscriber had the interruption not occurred. To satisfy the subscription, these missing events would normally have to be delivered in their entirety when access is resumed. Often, however, the nature of the subscriber's application allows it to tolerate receiving a much smaller set of events, i.e., a summary of the missing events. For example, a subscriber application interested only in the maximum, minimum, and current price of XYZ's stock can reconstruct this information after receiving just a few messages, rather than all missing messages. Replacing a possibly large set of missing events by a smaller summary is advantageous, since fewer messages have to travel through the network, and the subscriber need not process all missing events. By providing summaries, load on the message delivery system, and processing time in the subscriber, can be reduced.

To inform the system of the type of summary appropriate for a particular subscriber, the subscriber must specify what it considers to be the essential content of an event stream. This specification may be referred to as the event stream interpretation. An event stream interpretation is a rule that, e.g., converts an event stream into a state. Two different event streams are considered equivalent for a particular subscriber if according to the client's event stream interpretation rule, the two streams yield the same state. In the two examples above, one subscriber would define a state having a tuple <max, min, current>, and the other would define a state having a count of number of drops below 120. Therefore, associated with each subscriber's respective state is a rule for deriving that state from the event stream.

The present invention provides a technique for exploiting the fact that the subscribers have defined event interpretation rules, to deliver optimized sequences, that may differ from the published sequences, but which are equivalent under the interpretation rule. One such technique involves monitoring an event stream for each subscriber, and computing the states before and after a subscriber's interruption using the respective event stream interpretation rule. After the interruption, the technique determines and delivers a (usually smaller) equivalent, but optimized summary of events which according to the given rule, converts the state before the interruption to the state after the interruption. Since these summary events yield the same state according to the subscriber's event stream interpretation, they are equivalent to the missing events in their entirety, and may be delivered to the subscriber in place of the (usually larger) set of missing events.

The invention includes (1) converting the event stream interpretation rules to a state transition automaton in which each event corresponds to a state transition; (2) using the automaton to generate a "distance estimator function," estimating the cost in messages to traverse between two states; and (3) using the automaton and the distance estimator together with a shortest-path graph search technique, treating the set of possible states as the vertices of the graph and the events as arcs between vertices. The arcs in the resulting shortest-path between the state before the interruption and the state after the interruption constitute the desired, optimized set of summary events.

Another technique involves detecting that certain events do not affect the state, and need not be delivered.

In this regard, the present invention provides, in one aspect, an event message handling system in which a subscriber node specifies an event interpretation rule for mapping an event message stream into a state. An optimized version of the event message stream is delivered to the subscriber node which correctly maps to the first state using the event interpretation rule. A sequencer node elsewhere in the system may receive the event message stream, and use the event interpretation rule to update a state therein as a function of incoming messages also sent thereto of the event message stream. The sequencer node delivers the optimized version of the event message stream sufficient to correctly update the subscriber's state such that the subscriber's state is equivalent to the sequencer node's representation of that state.

The invention may be used to recover the subscriber node from missing a portion of the event message stream in which case an optimized version of the missing portion of the event message stream is delivered to the subscriber. The missing portion of the event message stream may result from the subscriber temporarily losing, and then regaining, its access to the event message stream.

A shortest path graph search technique may be employed between a start and end of the missing portion of the event message stream to generate the optimized version thereof. If the event interpretation rule is in replacement form such that fields in the first state are replaced by parameters of the incoming messages, optimizations of the shortest path graph search technique are possible. In one optimization, the event interpretation rule in replacement form is extended to an unconstrained replacement form, and the extended unconstrained replacement form rule is used as an estimator function in the shortest path graph search technique. If the interpretation rule is an unconstrained replacement form the rule is extended into uniform unconstrained replacement form, and is thereafter used as the estimator function in the shortest path graph search technique.

A plurality of sequencer nodes may retain their own versions of a plurality of subscribers' event interpretation rules such that the sequencer nodes can deliver to the subscriber nodes optimized version of their respective event message streams, in accordance with the appropriate rules, to update the respective states in the subscriber nodes.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

FIG. 1b is a diagram of an exemplary network of processing nodes implementing the Information Flow Graph of FIG. 1a;

DETAILED DESCRIPTION OF THE PREFERRED EMBODIMENT(S)

Figure 1A:
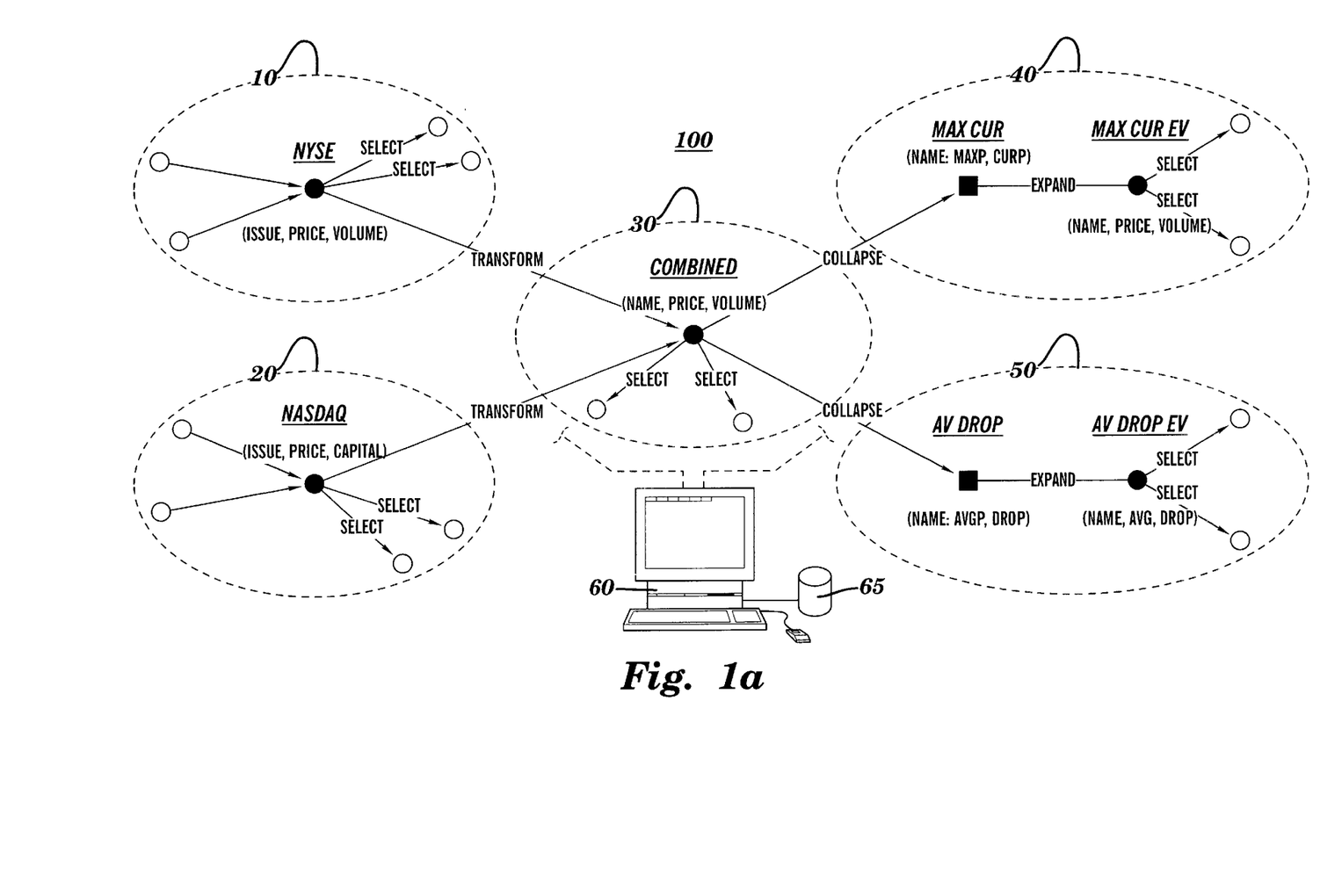
FIG. 1a is an Information Flow Graph describing an exemplary message processing system having a plurality of information producers and a plurality of information subscribers, with intermediate select and transform operations.

FIG. 1a is an information Flow Graph ("IFG") for a message processing system 100 which collects, processes and forwards stock market information. An IFG may adhere to the following exemplary syntax:

Information spaces ("I/S"). They are either event histories (filled circles, e.g. NYSE) or states (filled squares, e.g. MaxCur). Event histories are lists of events. They may grow monotonically over time as events are added. States capture selected information about event streams, and are typically not monotonic. The type of an information space is defined by an information schema. Each event may be a typed tuple. For instance, the NASDAQ information space is a sequence of events having the schema [issue: string, price: integer, capital: integer]. The MaxCur information space is a state represented as a keyed relation associating the name of a stock issue with its maximum price and current price. Certain event histories, represented as unfilled circles, are sources or sinks; these represent the information providers and consumers. (The terms "information space," "node," "publisher," and "subscriber" are used broadly herein and connote any identifiable combination of hardware and/or software to and/or from which messages are passed. The terms "message," "event" and "record" are similarly used broadly herein and connote data passed between nodes without restriction to use, format or transmission type.)

Dataflows. These are directed arcs (arrows) with associated operations connecting nodes in the graph. The graph may be required to be acyclic, sources must have only out-arcs, sinks have only in-arcs, and state nodes have only a single in-arc. The arcs determine how the contents of the information spaces change as events enter the system.

There are four types of dataflows with associated operations, indicated by the labels on the arcs:

Select. This arc/operation connects two event histories having the same schema. Associated with each select arc is a predicate on the attributes of the event type associated with the information space. An example of a predicate is the expression (issue="XYZ" & price<120). All events in the information space at the source of the arc which satisfy the predicate are delivered to the information space at the destination of the arc.

Transform. This arc/operation connects any two event histories which may have different event schemas $E_S$ and $E_D$. Associated with each transform arc is a rule for mapping an event of type $E_S$ into an event of type $E_D$. For example, the transform arc connecting the space NASDAQ to the space Combined is labeled with the rule [issue:i, price:p, capital:c]→[name: NAS(i), price:p, volume:c/p]. This rule maps the issue to a name using the function NAS, and derives volume as capital divided by price. Whenever a new event arrives at the space at the source of the arc, it is transformed using the rule and delivered to the space at the destination of the arc.

Collapse. This arc/operation connects an event history to a state. Associated with each collapse arc is a rule for collapsing a sequence of events to a state. The rule maps a new event and a current state into a new state. For example the following rules define the collapse arc from the space Combined to the space Maxcur:

<n,p,v>, <n: max<p, cur>∪s→<n:p, p>∪s
<n,p,v>, <n: max≧p, cur>∪s→<n:max, p>∪s

Given an initial state (in this example, a maximum and current price of zero for all stocks), the state at the destination of the arc is updated each time a new event is added to the space at the source of the arc by applying the rule.

Expand. This is the inverse of Collapse. This arc links a state to an information space. Associated with each arc is a collapse rule. When the state at the source of the arc changes, the destination space is updated so that the sequence of events it contains collapses to the new state. Unlike the other dataflows, expand is non-deterministic. For a given state, there may be many possible event sequences which map to the state, or there may be none. The non-determinism is further constrained by the need for information spaces to be observably monotonic: that is, an expansion may not "undeliver" an event already delivered to a consumer. We restrict the syntax to avoid the case in which there is no possible event sequence, but we exploit the non-determinism to give flexibility to the implementation to deliver one of a set of equivalent event sequences.

In addition to the above four operations, there are two operations implicit in the graph. Fan-in (merge) to an event history produces a merge of the events. (There is non-determinism here, as multiple interleavings are possible.) Fan-out (split) from an event history replicates the events.

Consider regions 10 and 20 of the IFG 100 of FIG. 1a. Each of the regions has an information space, a collection of producers, and a collection of consumers with content-based selections of the events of the information spaces NYSE and NASDAQ. These regions are examples of "pure content-based pub/sub" systems. The consumers with content-based selections correspond to subscribers.

Region 30 represents a service attempting to integrate the two spaces NYSE and NASDAQ. These exchanges have different conventions for issue names;

therefore it is desirable to map the local issue names to a common name via some conversion table. Further, one exchange delivers trades using price and volume, the other using price and total capital (price times volume). It is therefore necessary to map these into either one of the two formats or a common format. The result is a new information space Combined, containing the union of the two original information spaces, but in a common format, enabled by the use of stateless event transforms. Subscribers to the new service can deal with this new space and need not even be aware of the existence of the original suppliers.

Region 40 represents a collection of subscribers to Combined who are interested in particular stock events, but whose requirements on guaranteed delivery are weaker. An event history, such as Combined, has a total order. Even though the total order depends upon non-deterministic factors, such as the order in which events from NYSE and events from NASDAQ are merged, the dataflow semantics discussed in the previous section guarantee that all subscribers to Combined receive the events in the same order. Guaranteeing this total order adds to the cost of the delivery protocol.

However, the subscribers to region 40 have a weaker requirement: they are interested only in tracking the maximum price and current price of each stock issue. They cannot ignore ordering entirely (otherwise they might swap today's price of XYZ with yesterday's price), but they can ignore the order between today's XYZ price and today's AB price. And under appropriate conditions, messages may be dropped altogether. These subscribers express this requirement by defining an event interpretation—a mapping of the event sequence into a state which captures precisely the information relevant to these subscribers, namely the current and maximum price of each issue.

The collapse operation converts the event sequence from Combined into a state representing this event interpretation. The expand operation converts the state back into an event sequence. The associated rule on this arc is the identical rule from the collapse arc. Therefore, the events in MaxCurEv can be any sequence of events whose interpretation is the same as the interpretation of the events in Combined. A trivial solution is to treat the collapse and expand as a null operation and deliver exactly the same events to Combined and to MaxCurEv. However, the non-determinism of expand permits cheaper solutions, in which some events can be dropped or permuted.

In accordance with the present invention, when a subscriber disconnects from the network without terminating the subscription and later reconnects, rather than bombarding the subscriber with all the events which would have been delivered during the disconnect period, the system instead can deliver a much shorter equivalent event sequence that preserves the specified interpretation: the current and maximum price of each stock. A technique for computing and delivering a minimal event sequence is discussed further below.

The IFGs discussed herein are logical descriptions of the flow of events in a message processing system (possibly stored on computer media 65 of a controlling system 60). Ultimately, this description must be realized on a physical network of messaging nodes, such as that shown in FIG. 1b.

Figure 1B:
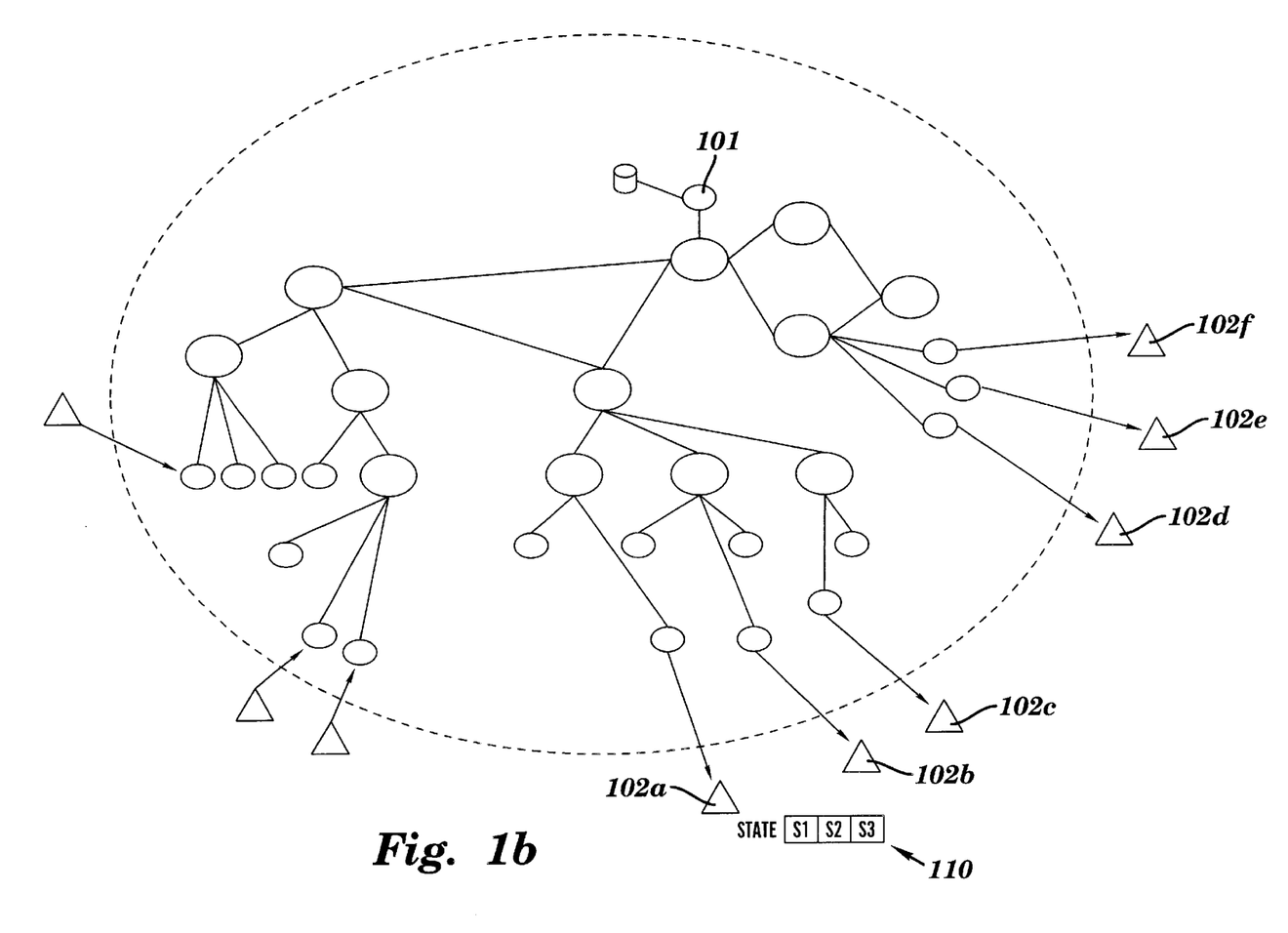

FIG. 1b depicts an exemplary implementation of a distributed message delivery system of processing nodes implementing the IFG of FIG. 1a, such as that disclosed in the previously filed, commonly assigned, copending U.S. Patent Application entitled "Message Sequencing For Ordered Multicasting of a Message Across a Routing Network," filed Mar. 30, 1999, Ser. No. 09/280,530, which application is hereby incorporated by reference herein in its entirety. For each subscriber node 102a, 102b . . . 102f requiring potential recovery from a loss of access to its event message stream, there exists at least one sequencing node 101 (or "sequencer"), either shared by subscribers (shown) or dedicated to each subscriber (not shown). The sequencer monitors (e.g., receives and numbers and potentially logs to stable storage) all events that will be delivered to its subscriber(s).

In one possible embodiment, there is a single sequencer for all subscribers in the network, and that sequencer keeps a uniform total order of messages common to all subscribers. But that is just one possible implementation. Any embodiment is possible, provided that the sequencer is capable of monitoring all messages destined for its subscriber(s), even during the periods when the subscriber(s) are disconnected.

Subscribers 102 are normally connected to the network through a communications link, and to their sequencer(s) through a possible path of communications links. State 110 of, e.g., subscriber 102a, is updated as a function of the event messages of the incoming event message stream.

The present invention utilizes sequencer 101 (possibly a computer system such as system 60 of FIG. 1a, with the requisite hardware, and data structures and computer program products stored on media 65 therein) for monitoring the event message stream destined for its respective subscriber(s), and for facilitating the recovery thereof in accordance with the techniques discussed below.

Figure 2:
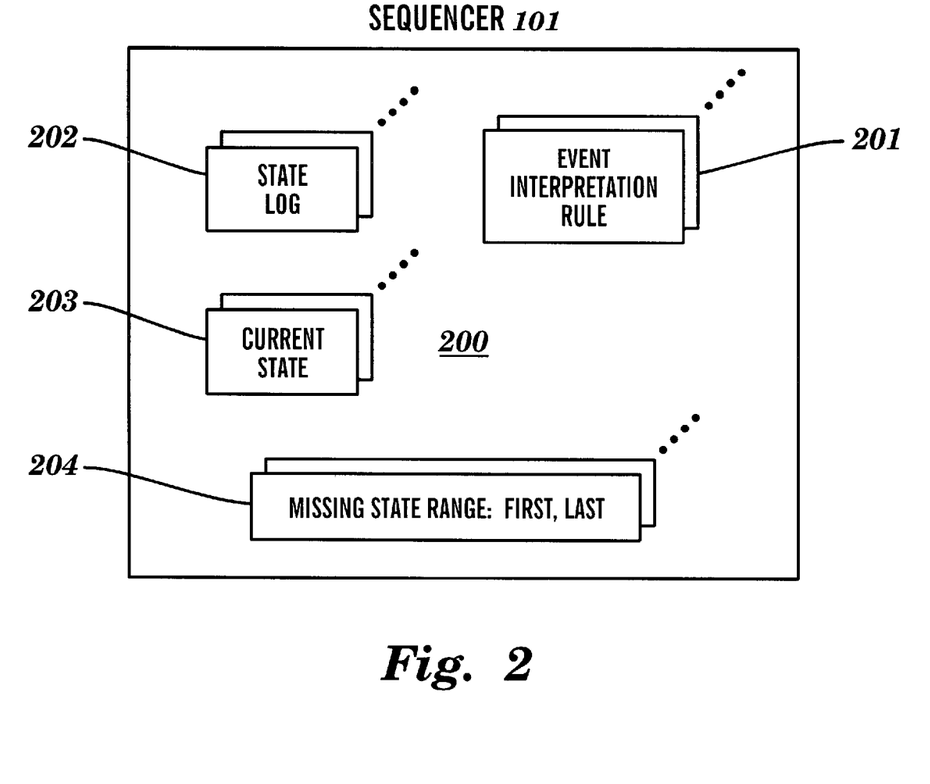
FIG. 2 depicts the data structures employed in a sequencing node to implement the recovery techniques of the present invention.

FIG. 2 illustrates exemplary data structures 200 maintained by the sequencer for these functions. One version of these structures is maintained for each respective subscriber being monitored by the sequencer, hence, multiple versions of these structures (201, 202 . . . ) as shown may be provided. The event stream interpretation rule 201 (shown in detail in tabular form in FIG. 3) for a given subscription to a subscriber is normally supplied/defined at the beginning of the subscription, before any messages have been delivered. The rule is written incrementally, i.e., as a function which converts a pair: <current state, new event> to a new state. Given a current state (s1, s2 and s3) and an ordered set of events comprising parameters (a, b and c), repeated applications of this function define the state that "interprets" the set of events.

Figure 3:
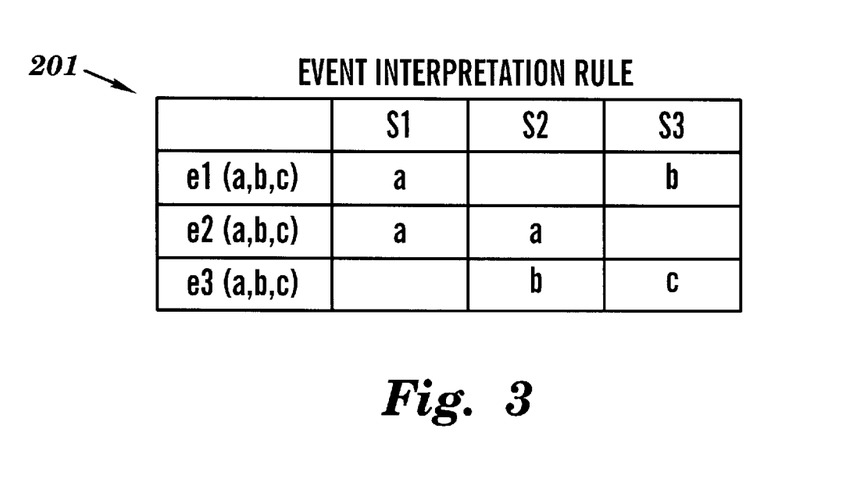
FIG. 3 is an exemplary event interpretation rule in tabular form.

Each row of the table corresponds to a particular collection of events meeting a particular condition or predicate "e", and having parameters, e.g. a, b, and c. Each column of the table corresponds to a component of the state. Each blank entry in the table indicates that the event in the corresponding row leaves the corresponding component of the state unchanged; each non-blank entry indicates that the event in the corresponding row replaces the corresponding component of the state. Not every rule can be expressed in this form, however, many can, such as the stock market examples discussed herein. Preferable forms of this event stream interpretation rule are discussed below, which facilitate more efficient computation of an optimized stream of missing events.

With continued reference to the data structures of FIG. 2, state log 202 for a given subscription is a stable representation of all the successive states through which the respective subscriber has passed: that is, the i-th entry in the log represents the state reached after processing events 1 through i. There are many alternative representations for state log 202. Although the simplest is to store a list of all the states, this may be inefficient; and one skilled in the art can derive techniques for representing a set of states more compactly by storing an earlier state plus the collection of events which arrived subsequent to that state. Whatever implementation is chosen must be sufficient to construct the i-th state given the state i.

The sequencer will also require the sequence number of the last event before an interruption and the sequence number of the last event before the reconnection as the "missing event range" 204. As discussed above, each subscriber may periodically disconnect, either at its own initiative or because of a failure of its connective link, causing a loss of event messages. Any known "session outage notification" technique (e.g., detection of lost connections of sockets) allows the sequencer(s) to detect when the connection has been broken, and similarly, any known technique for later re-establishing the connection allows the sequencer to detect when the connection has been re-established. This information is also required by the sequencer(s) to create a sequence of messages sufficient to maintain the state the subscriber's state 110, despite the interruption in access to its message stream.

Finally, the sequencer holds a current state 203, which is initially the initial state specified by the subscriber, but which is updated as each successive event arrives.

Figure 4:
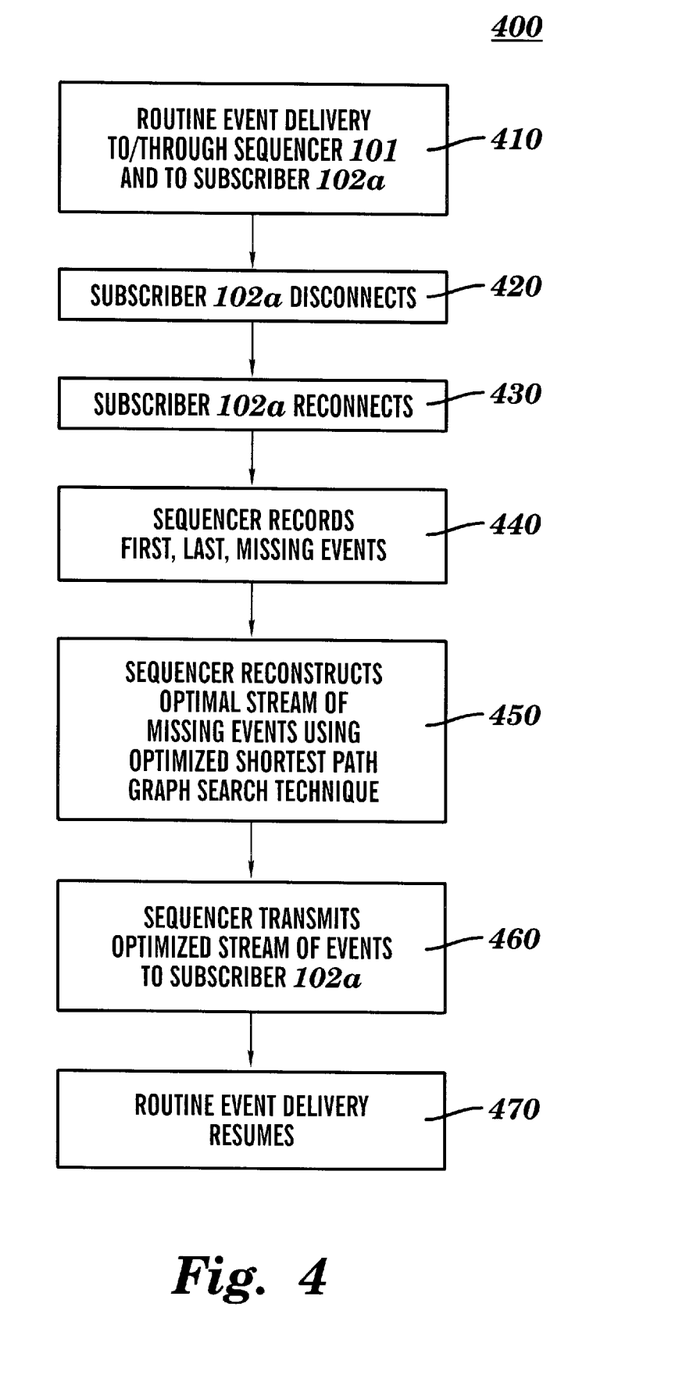
FIG. 4 is a flow diagram of the recovery technique of the present invention.

Using these data structures 200, the present invention facilitates recovery of a subscriber from an interruption in its access to its event message stream, with reference to the flow diagram 400 of FIG. 4.

During normal operation, events arrive at the sequencer 101 from the information publishers. Each time a new event arrives, the current state 203 is updated by applying the function in the event stream interpretation rule 201 to the current state and the new event, to yield a new (current) state 203. When the subscriber (e.g., subscriber 102a) is properly connected, these new events are also delivered to the subscriber (Step 410), except optionally those events that do not affect the state may be omitted.

When the subscriber disconnects (Step 420), events continue to arrive at the respective sequencer 101, but will no longer be delivered to the subscriber. When the subscriber later reconnects (Step 430), the sequencer is notified and informed of the last event number the subscriber received prior to the disconnect. The current event number is the last missing event (Step 440). These two numbers are maintained in the missing event range structure 204. These numbers are then used to query the state log 202 to obtain two states. The first state is called the "start state"; it is the state reached after the last successfully sent event. The second state is called the "goal state"; it is the state which would have been reached had all the missing messages been delivered.

At this point, the flow of messages to the client is not resumed until the optimized event stream has been successfully computed and sent to the subject subscriber. The optimized event stream is computed (Step 450) as follows. The start state, goal state, and event stream interpretation rule 201, are used as inputs to an "Moore-Dijkstra shortest path graph search" technique. This technique treats each state as a vertex in a graph, and each event as an arc linking two vertices. The technique also usually requires an estimate of the cost associated with each arc. Assuming that the cost of delivering any single event is approximately the same, we can estimate a cost of 1 for each arc. This technique is described in Gondran, M., Minoux, M., "Graphs and Algorithms," Wiley-Interscience, 1986, pp. 44–45 et seq., pp 78–79 et seq., which is hereby incorporated by reference herein in its entirety. The result of applying this technique is to obtain a path of arcs, representing the least cost set of events linking the start state to the goal state.

More particularly, the Moore-Dijkstra technique may be implemented backwards from the goal state g toward the start state $s_0$, although an opposite search direction could also be used. A set of candidate paths is maintained, and an estimator function h, is employed, where h(s) is an estimate of the shortest path from a current state s to the start state $s_0$. These paths are sorted based upon the actual length of the path from g to s plus the estimated length h(s) from s to $s_0$. Beginning with the node n at the end of the best candidate path, of length f(n), neighbor n' of n is determined that minimizes (f(n)+1)+h(n')). The candidate path then traverses in the direction to n'. (All other neighbors are ignored unless and until all candidates of at least this distance have been explored.)

The sequencer delivers only the optimized stream of events (i.e., the labels along the path) determined by this technique (Step 460), and then resumes the flow of new messages to the client (Step 470).

In the general case, it may be expensive to compute the absolute shortest path using the Moore-Dijkstra technique, and finding suitable estimator functions h(s) is often challenging. One can obtain an estimator h(s) for a particular graph by constructing an exact solution for an extended graph with a strict superset of edges. Disclosed herein is a strategy for finding h for an important subclass of interpretation rules—those which can be converted to the replacement forms described below—by implementing a hierarchical approach.

Figure 6:
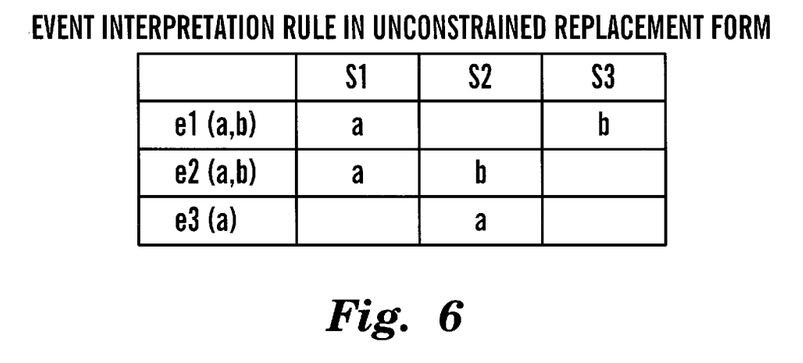
FIG. 6 is an exemplary event interpretation rule in unconstrained replacement form.
Figure 7:
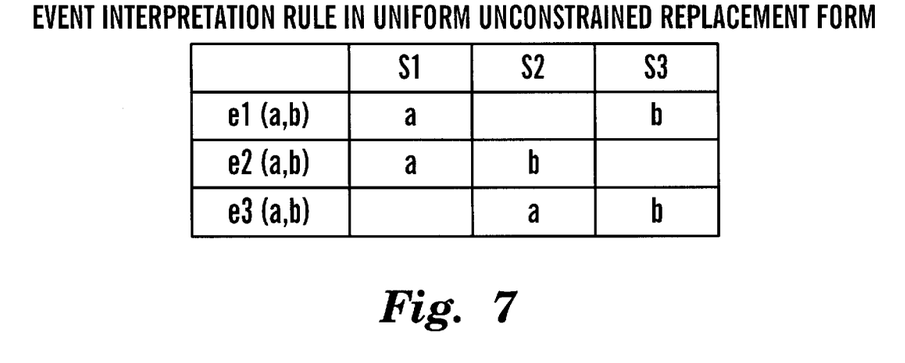
FIG. 7 is an exemplary event interpretation rule in uniform unconstrained replacement form.

In the preferred embodiment of this invention, the event stream interpretation rule is cast in one of three special formats: "replacement form" (FIG. 5), a special form of replacement form called "unconstrained replacement form" (FIG. 6), or a special form of unconstrained replacement form called "uniform unconstrained replacement form" (FIG. 7). In all these forms, the rules are expressed as a table or matrix whose columns correspond to the number of attributes in the state, and whose rows correspond to the number of different formats of events.

Figure 5:
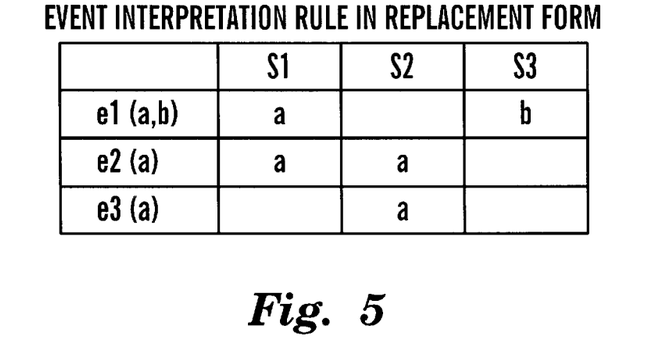
FIG. 5 is an exemplary event interpretation rule in replacement form.

When an event interpretation rule is in replacement form ("RF"), the state is a collection of attributes, corresponding to the columns of FIG. 5. Associated with each row is an event pattern (predicate "e") with parameters. When an event arrives matching the predicate of one of the rows, then the values of those attributes in the non-blank columns in the appropriate row are replaced by the values of the named parameters.

A rule in replacement form is additionally in unconstrained replacement form ("URF") provided that the non-blank entries in each row are all different parameters. (e.g., FIG. 6)

A table in unconstrained replacement form is additionally in uniform unconstrained replacement form ("UURF") provided that if a row has k non-blank entries in k columns, then for any other combination of k columns there exists a row with non-blank entries in these columns. (e.g., FIG. 7).

Figure 8:
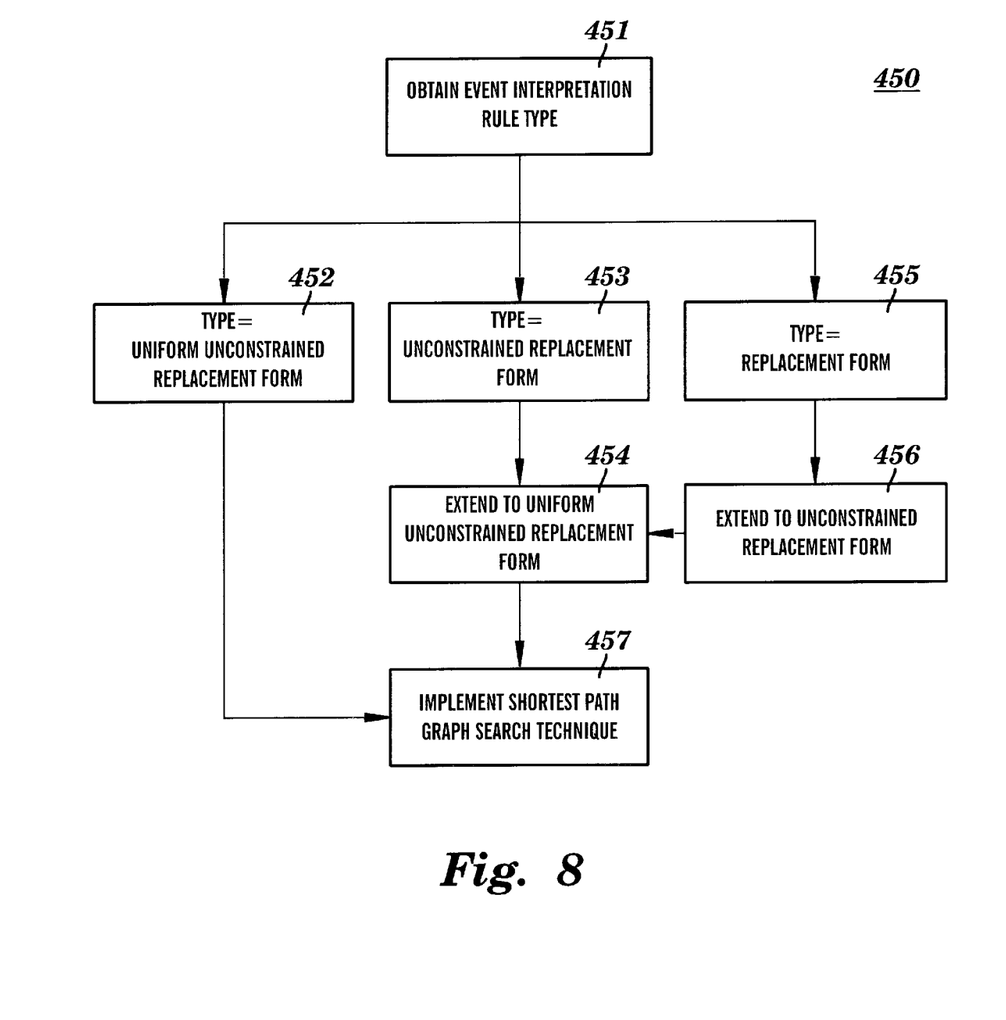
FIG. 8 is a flow diagram of the optimized shortest path graph search technique of the present invention.

These preferred forms can be used to generate more efficient searches for the shortest path solution, with reference to the flow diagram of FIG. 8, summarizing the shortest path determination Step 450 of FIG. 4.

Initially, the type of event interpretation rule is obtained (Step 451), and if the rule is in uniform unconstrained replacement form (Step 452), then the shortest path between any start state and any goal state contains a number of events consisting of the number n of different state attributes, divided by k and rounded up to the nearest integer, and the shortest path technique is applied directly (Step 457).

If an event interpretation rule is not in uniform unconstrained replacement form, but is in unconstrained replacement form (Step 453), then it can be extended to uniform unconstrained replacement form (Step 454) by adding additional event formats and additional rows containing k non-blank entries, where k is the number of non-blank entries in the row with the greatest number of non-blank entries. (This is equivalent to adding arcs to the state graph of FIG. 10, discussed further below.) For example, the rule of FIG. 6 has been extended to that of FIG. 7. The extended problem can then be solved easily and directly as discussed in the previous paragraph (Step 457).

The solution to the extended problem is an estimator of the solution to the original problem, since the shortest path in the solution to the extended problem is guaranteed to be shorter than or equal to the length of the shortest path in the solution to the original problem. The existence of the estimator allows a more efficient technique to be used to compute the shortest path.

Similarly, if an event interpretation rule is not in unconstrained replacement form, but it is in replacement form (Step 455), then it can be extended to unconstrained replacement form by adding additional parameters to events so that any row which uses the same parameter twice in the original rule will instead use two different parameters, and then (optionally) extended to uniform unconstrained replacement form (Step 457). For example, the rule of FIG. 5 has been extended to the rule in FIG. 6, and then to FIG. 7. As before, the exact solution to the extended problem serves as an estimator to the solution of the original problem.

Summarizing, any problem in unconstrained form but not uniform unconstrained replacement form can be solved by extending it to uniform unconstrained form, and using the exact solution to the extended problem as an estimator for the original problem, and then applying Moore-Dijkstra. Similarly, any problem in constrained form can be extended to unconstrained form by assuming that all steps except the first (for which the constraints are known) may follow new rules in which additional parameters have been added as necessary to eliminate constraints.

The extension from constrained to unconstrained form, or from unconstrained to uniform unconstrained form is equivalent to adding arcs to the state graph. The optimal solution to the extended problem therefore serves as an estimator for the original problem.

The more efficient version of the Moore-Dijkstra technique with an estimator can therefore be used, when the event interpretation rule is in replacement form.

If one set of interpretation rules is used to derive the state and another different set of rules is used to generate the state transition automaton used in a shortest path determination, then the identical mechanism can also be used to generate "derived events," such as translating a sequence of stock quotes into new events such as updated averages, or alerts, or trends.

As an illustrative example of the present invention, suppose a mobile client subscribes to the XYZ stock events from the information space CurMaxEv of events equivalent to the events in Combined using the state CurMax defined above with respect to FIG. 1*a*.

Figure 9:
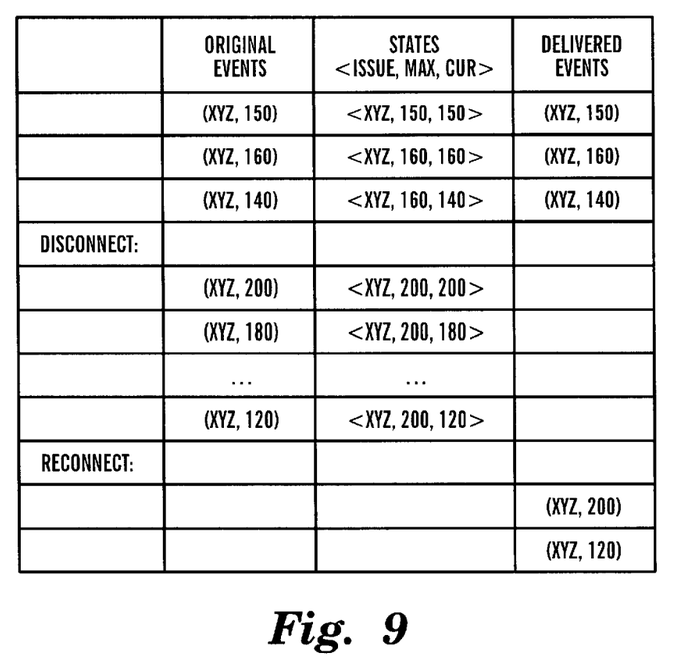
FIG. 9 depicts, for a stock monitoring example, an interrupted event message stream to a subscriber, and the optimized, equivalent stream determined in accordance with the present invention.

After receiving a number of events as shown in FIG. 9, and arriving at a state in which XYZ's maximum price is 160 and its current price is 140, the client disconnects. While the client is disconnected, a long series of events is published, arriving at a new state with maximum price of 200 and current price of 120. The mobile client then reconnects to the system. If the system is able to exploit the knowledge of the client's interpretation of event sequences, it should be able to deliver just the two events [XYZ, 200] and [XYZ, 120] rather than the much longer sequence of published events. The table of FIG. 9 shows the original events, the generated state, and the compressed set of delivered events.

Figure 10:
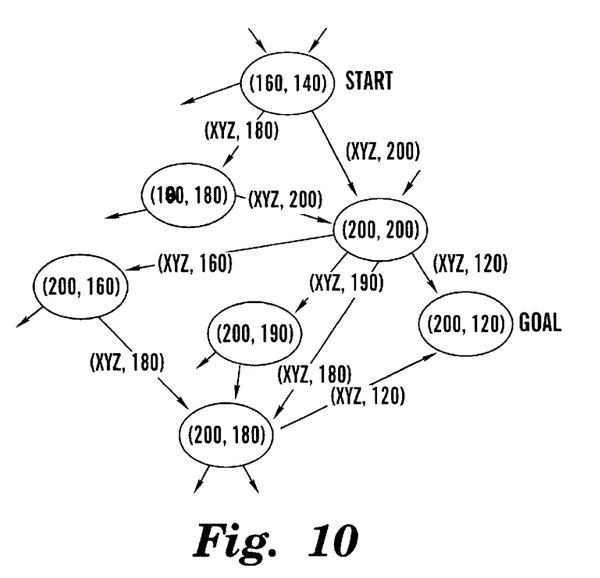
FIG. 10 is the state graph used to determine the shortest path for the example, interrupted event message stream of FIG. 9.

Given a current state, a goal state, and an interpretation rule, what is required in the generation of the optimized sequence of events which in the context of the current state, yields the goal state. As discussed above, this problem can be converted into a shortest path graph search problem, in which the states are represented as vertices in a graph, and each possible event transition is defined as an arc between vertices. Each arc has an associated cost (assumed herein to be a unit cost 1). FIG. 10 shows a fragment of the graph for this example.

Figure 11A:
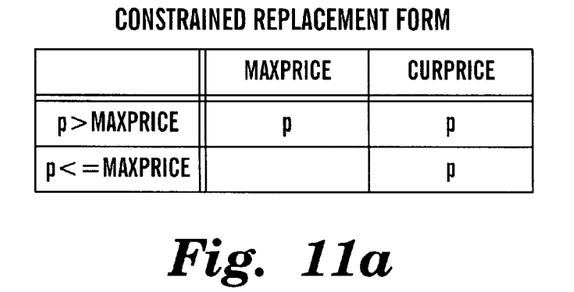
FIGS. 11a–c represents the original, constrained event interpretation rule extended into uniform unconstrained form to arrive at the shortest path for the example, interrupted event message stream of FIG. 9.
Figure 11B:
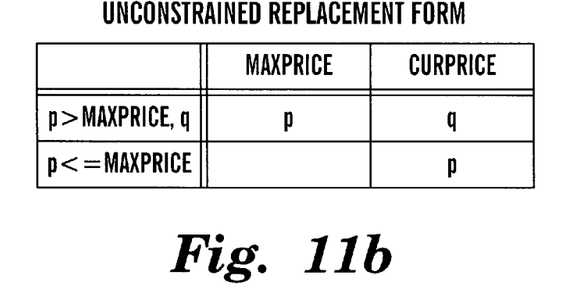
Figure 11C:
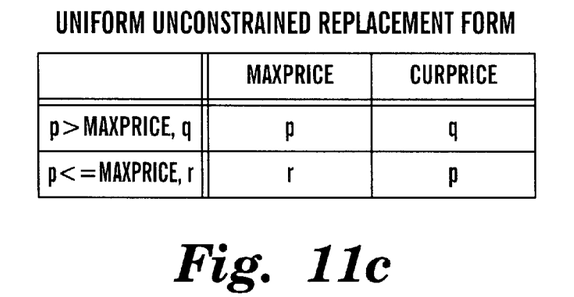

This example can be put into the form of the constrained rule of FIG. 11a. This problem can be solved by using the corresponding unconstrained rules (FIG. 11b or FIG. 11c) as an estimator: In this case, the estimation function is straightforward: the estimated distance from start to goal equals the number of issues for which the current state differs in curprice or maxprice from the goal state.

In this example, finding a path from <XYZ, 160, 140> to state <XYZ, 200, 120> turns out to be so simple that the estimators would not really be needed. Starting at goal state <200, 120>, only the second row of the matrix leads to a predecessor state, which has the form <200, *>. For any value of the second state except 200, the first row's condition cannot be satisfied and therefore the estimated distance from the start state is 2. For the state <200, 200> the estimated distance is 1. State <200, 200> is therefore chosen as the best candidate to continue the search. In fact, this state satisfies the conditions for firing row one of the matrix to reach a predecessor <*, *>, to reach start state <160, 140>.

While the invention has been particularly shown and described with reference to preferred embodiment(s) thereof, it will be understood by those skilled in the art that various changes in form and details may be made therein without departing from the spirit and scope of the invention.

What is claimed is:

1. In an event message handling system, in which a subscriber node specifies an event interpretation rule for mapping an event message stream into a first state, a method comprising:

delivering to the subscriber node an optimized version of the event message stream which correctly maps to the first state using the event interpretation rule, wherein the optimized version is a relevant summary of the event message stream based on the event interpretation rule.

2. The method of claim 1, further comprising:

a sequencer node elsewhere in the system receiving the event message stream, and using the event interpretation rule to update a second state therein as a function of incoming event messages of the event message stream delivered thereto.

3. The method of claim 2, wherein said delivering includes:

the sequencer node delivering the optimized version of the event message stream sufficient to correctly update the first state such that the first state is equivalent to the second state updated in the sequencer node.

4. The method of claim 1, wherein the subscriber node receives the event message stream from which it updates the first state therein, the method further comprising:

recovering from the subscriber node missing a portion of the event message stream, including:
      a sequencer node delivering to the subscriber node an optimized version of the missing portion of the event message stream sufficient to correctly update the first state therein.

5. The method of claim 4, further comprising:

the subscriber node temporarily losing, and then regaining, its access to the event message stream thereby resulting in the portion of the event message stream missing from the subscriber node, and wherein said delivering includes:
      delivering the optimized version of the missing portion of the event message stream to the subscriber after said regaining.

6. The method of claim 4, further comprising:

using a shortest path graph search technique between a start and end of the missing portion of the event message stream to generate the optimized version of the missing portion of the event message stream.

7. The method of claim 6, wherein the event interpretation rule is in replacement form such that fields in the first state are replaced by parameters of the incoming event messages of the event message stream.

8. The method of claim 7, wherein said using a shortest path graph search technique includes:

extending the event interpretation rule in replacement form to unconstrained replacement form; and using the extended, unconstrained replacement form rule as an estimator function in the shortest path graph search technique.

9. The method of claim 7, wherein the event interpretation rule is in unconstrained replacement form, and wherein said using a shortest path graph search technique includes:

extending the event interpretation rule in unconstrained replacement form to uniform unconstrained replacement form; and using the extended, uniform unconstrained replacement form rule as an estimator function in the shortest path graph search technique.

10. The method of claim 7, wherein the event interpretation rule is in uniform unconstrained replacement form, and wherein said using a shortest path graph search technique includes:

using the uniform unconstrained replacement form rule as an estimator function in the shortest path graph search technique.

11. The method of claim 1, further comprising:

a plurality of subscriber nodes, including the subscriber node, each specifying a respective event interpretation rule to map a respective event message stream into a respective first state; and a sequencer node, or a plurality of sequencer nodes, receiving the respective event message streams, and using each respective event interpretation rule to update a respective second state corresponding to a subscriber node as a function of incoming event messages of the corresponding event message stream, in preparation for delivering respective, optimized versions of the event message streams to any one or more of the subscriber nodes.

12. In an event handling system in which a subscriber node receives an event message stream from which it updates a first state therein according to an event interpretation rule, a method comprising:

a sequencer node also receiving the event message stream and updating a second state therein according to the event interpretation rule;

the subscriber node temporarily losing access to the event message stream thereby resulting in said subscriber node missing a portion of the event message stream;

the sequencer node continuing said receiving of the event message stream during the access loss of the subscriber node and continuing said updating of the second state therein; and determining, and delivering to the subscriber node when it regains access to the event message stream, an optimized version of the missing portion of the event message stream sufficient to update the first state to be equivalent to the second state being updated in the sequencer node, wherein the optimized version is a relevant summary of the missing portion of the event message stream based on the event interpretation rule.

13. The method of claim 12, wherein said determining the optimized version of the missing portion of the event message stream includes using a shortest path graph search technique.

14. The method of claim 13, further comprising:
the subscriber node using an event interpretation rule in replacement form such that fields in the first state are replaced by parameters of the incoming event messages of the event message stream.

15. The method of claim 14, wherein said using a shortest path graph search technique includes:
extending the event interpretation rule in replacement form to unconstrained replacement form; and
using the extended, unconstrained replacement form rule as an estimator function in the shortest path graph search technique.

16. The method of claim 14, wherein the event interpretation rule is in unconstrained replacement form, and wherein said using a shortest path graph search technique includes:
extending the event interpretation rule in unconstrained replacement form to uniform unconstrained replacement form; and
using the extended, uniform unconstrained replacement form rule as an estimator function in the shortest path graph search technique.

17. The method of claim 14, wherein the event interpretation rule is in uniform unconstrained replacement form, and wherein said using a shortest path graph search technique includes:
using the uniform unconstrained replacement form rule as an estimator function by the shortest path graph search technique.

18. The method of claim 12, further comprising:
a plurality of subscriber nodes, including the subscriber node, each receiving a respective event message stream from which it updates a first state therein according to a respective event interpretation rule; and
the sequencer node, or a plurality of sequencer nodes including the sequencer node, receiving the respective event message streams, and using each respective event interpretation rule to update a respective second state corresponding to a subscriber node as a function of incoming event messages of the corresponding event message stream, in preparation for delivering respective, optimized versions of missing portions of event message streams to any one or more of the subscriber nodes in the event of a subscriber node's loss of access to its respective event message stream.

19. In an event message handling system in which a subscriber node receives an event message stream having a state defined by an event interpretation rule, a method for preserving the state of the event message stream, comprising:
a node, other than the subscriber node, maintaining the event interpretation rule therein in preparation for providing an optimized event message stream to the subscriber node, the optimized event message stream sufficient to correctly update the first state, wherein the optimized event message stream is a relevant summary of the event message stream based on the event interpretation rule.

20. The method of claim 19, wherein the sequencer node, or a plurality of sequencer nodes including the sequencer node, maintain a plurality of event interpretation rules therein for respective subscribers of a plurality of subscriber nodes each receiving respective event message streams, in preparation for providing respective, optimized event message streams to any one or more of the subscriber nodes.

21. A method of delivering an equivalent event stream to a subscriber from one or more information providers in an event distribution system, in which said subscriber specifies an event stream interpretation rule that maps sequences of events to states, and said equivalent event stream maps to the same state as the sequence of events published by said one or more information providers, wherein said equivalent event stream is a relevant summary of the published sequence of events based on the event stream interpretation rule.

22. The method of claim 21 in which said subscriber loses connectivity with said one or more information providers, during which time missing events are published by said one or more information providers, and in which said equivalent event stream is delivered upon the one or more subscribers regaining connectivity, and in which said equivalent event stream represents a summary of said missing events.

23. The method of claim 22 in which said computing of the equivalent event stream is performed by saving the state before and after the generation of said missing events as a start and goal state respectively, and by using a shortest path graph search technique over a state transition graph determined by said event stream interpretation rule to compute the shortest path from said start state to said goal state, and delivering the equivalent event stream determined by said shortest path.

24. The method of claim 23 in which said event stream interpretation rule is specified in replacement form and in which said shortest path graph search technique is accelerated by using an estimator function derived by extending the replacement form rule to an unconstrained replacement form rule, and by extending an unconstrained replacement form rule to a uniform unconstrained replacement form rule.

25. In an event message handling system, in which a subscriber node specifies an event interpretation rule for mapping an event message stream into a first state, a system comprising:
means for delivering to the subscriber node an optimized version of the event message stream which correctly maps to the first state using the event interpretation rule, wherein the optimized version is a relevant summary of the event message stream based on the event interpretation rule.

26. The system of claim 25, further comprising:
a sequencer node elsewhere in the system for receiving the event message stream, and using the event interpretation rule to update a second state therein as a function of incoming event messages of the event message stream delivered thereto.

27. The system of claim 26, wherein said means for delivering includes:
means for the sequencer node delivering the optimized version of the event message stream sufficient to correctly update the first state such that the first state is equivalent to the second state updated in the sequencer node.

28. The system of claim 25, wherein the subscriber node receives the event message stream from which it updates the first state therein, the system further comprising:
  means for recovering from the subscriber node missing a portion of the event message stream, including:
    means for a sequencer node delivering to the subscriber node an optimized version of the missing portion of the event message stream sufficient to correctly update the first state therein.

29. The system of claim 28, wherein the subscriber node temporarily losing, and then regains, its access to the event message stream thereby resulting in the portion of the event message stream missing from the subscriber node,
and wherein said means for delivering includes:
  means for delivering the optimized version of the missing portion of the event message stream to the subscriber after said regaining.

30. The system of claim 28, further comprising:
  means for using a shortest path graph search technique between a start and end of the missing portion of the event message stream to generate the optimized version of the missing portion of the event message stream.

31. The system of claim 30, wherein the event interpretation rule is in replacement form such that fields in the first state are replaced by parameters of the incoming event messages of the event message stream.

32. The system of claim 31, wherein said means for using a shortest path graph search technique includes:
  means for extending the event interpretation rule in replacement form to unconstrained replacement form; and
  means for using the extended, unconstrained replacement form rule as an estimator function in the shortest path graph search technique.

33. The system of claim 31, wherein the event interpretation rule is in unconstrained replacement form, and wherein said means for using a shortest path graph search technique includes:
  means for extending the event interpretation rule in unconstrained replacement form to uniform unconstrained replacement form; and
  means for using the extended, uniform unconstrained replacement form rule as an estimator function in the shortest path graph search technique.

34. The system of claim 31, wherein the event interpretation rule is in uniform unconstrained replacement form, and wherein said means for using a shortest path graph search technique includes:
  means for using the uniform unconstrained replacement form rule as an estimator function in the shortest path graph search technique.

35. The system of claim 25, further comprising:
  a plurality of subscriber nodes, including the subscriber node, each specifying a respective event interpretation rule to map a respective event message stream into a respective first state; and
  a sequencer node, or a plurality of sequencer nodes, receiving the respective event message streams, and using each respective event interpretation rule to update a respective second state corresponding to a subscriber node as a function of incoming event messages of the corresponding event message stream, in preparation for delivering respective, optimized versions of the event message streams to any one or more of the subscriber nodes.

36. In an event handling system in which a subscriber node receives an event message stream from which it updates a first state therein according to an event interpretation rule, a system comprising:
  means for a sequencer node also receiving the event message stream and updating a second state therein according to the event interpretation rule;
  wherein the subscriber node temporarily loses access to the event message stream thereby resulting in said subscriber node missing a portion of the event message stream;
  means for the sequencer node continuing said receiving of the event message stream during the access loss of the subscriber node and continuing said updating of the second state therein; and
  means for determining, and delivering to the subscriber node when it regains access to the event message stream, an optimized version of the missing portion of the event message stream sufficient to update the first state to be equivalent to the second state being updated in the sequencer node, wherein the optimized version is a relevant summary of the missing portion of the event message stream based on the event interpretation rule.

37. The system of claim 36, wherein said means for determining the optimized version of the missing portion of the event message stream includes means for using a shortest path graph search technique.

38. In an event message handling system in which a subscriber node receives an event message stream having a state defined by an event interpretation rule, a system for preserving the state of the event message stream, comprising:
  a node, other than the subscriber node, maintaining the event interpretation rule therein in preparation for providing an optimized event message stream to the subscriber node, the optimized event message stream sufficient to correctly update the first state, wherein the optimized event message stream is a relevant summary of the event message stream based on the event interpretation rule.

39. The system of claim 38, wherein the sequencer node, or a plurality of sequencer nodes including the sequencer node, maintain a plurality of event interpretation rules therein for respective subscribers of a plurality of subscriber nodes each receiving respective event message streams, in preparation for providing respective, optimized event message streams to any one or more of the subscriber nodes.

40. An article of manufacture comprising a computer useable medium having computer readable program code means embodied therein for an event message handling system, in which a subscriber node specifies an event interpretation rule for mapping an event message stream into a first state, the article of manufacture comprising:
  computer readable program code means for delivering to the subscriber node an optimized version of the event message stream which correctly maps to the first state using the event interpretation rule, wherein the optimized version is a relevant summary of the event message stream based on the event interpretation rule.

41. The article of manufacture of claim 40, further comprising:
  computer readable program code means for a sequencer node elsewhere in the system receiving the event message stream, and using the event interpretation rule to update a second state therein as a function of incoming event messages of the event message stream delivered thereto.

42. The article of manufacture of claim 41, wherein said computer readable program code means for delivering includes:

computer readable program code means for the sequencer node delivering the optimized version of the event message stream sufficient to correctly update the first state such that the first state is equivalent to the second state updated in the sequencer node.

43. The article of manufacture of claim 40, wherein the subscriber node receives the event message stream from which it updates the first state therein, the article of manufacture further comprising:

computer readable program code means for recovering from the subscriber node missing a portion of the event message stream, including:

computer readable program code means for a sequencer node delivering to the subscriber node an optimized version of the missing portion of the event message stream sufficient to correctly update the first state therein.

44. The article of manufacture of claim 43, wherein the subscriber node temporarily loses, and then regains, its access to the event message stream thereby resulting in the portion of the event message stream missing from the subscriber node,
and wherein said computer readable program code means for delivering includes:

computer readable program code means for delivering the optimized version of the missing portion of the event message stream to the subscriber after said regaining.

45. The article of manufacture of claim 43, further comprising:

computer readable program code means for using a shortest path graph search technique between a start and end of the missing portion of the event message stream to generate the optimized version of the missing portion of the event message stream.

46. The article of manufacture of claim 45, wherein the event interpretation rule is in replacement form such that fields in the first state are replaced by parameters of the incoming event messages of the event message stream.

47. The article of manufacture of claim 46, wherein said computer readable program code means for using a shortest path graph search technique includes:

computer readable program code means for extending the event interpretation rule in replacement form to unconstrained replacement form; and     computer readable program code means for using the extended, unconstrained replacement form rule as an estimator function in the shortest path graph search technique.

48. The article of manufacture of claim 46, wherein the event interpretation rule is in unconstrained replacement form, and wherein said computer readable program code means for using a shortest path graph search technique includes:

computer readable program code means for extending the event interpretation rule in unconstrained replacement form to uniform unconstrained replacement form; and     computer readable program code means for using the extended, uniform unconstrained replacement form rule as an estimator function in the shortest path graph search technique.

49. The article of manufacture of claim 46, wherein the event interpretation rule is in uniform unconstrained replacement form, and wherein said computer readable program code means for using a shortest path graph search technique includes:

computer readable program code means for using the uniform unconstrained replacement form rule as an estimator function in the shortest path graph search technique.

50. The article of manufacture of claim 40, further comprising:

computer readable program code means for a plurality of subscriber nodes, including the subscriber node, each specifying a respective event interpretation rule to map a respective event message stream into a respective first state; and     computer readable program code means for a sequencer node, or a plurality of sequencer nodes, receiving the respective event message streams, and using each respective event interpretation rule to update a respective second state corresponding to a subscriber node as a function of incoming event messages of the corresponding event message stream, in preparation for delivering respective, optimized versions of the event message streams to any one or more of the subscriber nodes.

51. An article of manufacture comprising a computer useable medium having computer readable program code means embodied therein for an event handling system in which a subscriber node receives an event message stream from which it updates a first state therein according to an event interpretation rule, the article of manufacture comprising:

computer readable program code means for a sequencer node also receiving the event message stream and updating a second state therein according to the event interpretation rule;

wherein the subscriber node temporarily loses access to the event message stream thereby resulting in said subscriber node missing a portion of the event message stream;

computer readable program code means for the sequencer node continuing said receiving of the event message stream during the access loss of the subscriber node and continuing said updating of the second state therein; and     computer readable program code means for determining, and delivering to the subscriber node when it regains access to the event message stream, an optimized version of the missing portion of the event message stream sufficient to update the first state to be equivalent to the second state being updated in the sequencer node, wherein the optimized version is a relevant summary of the missing portion of the event message stream based on the event interpretation rule.

52. The article of manufacture of claim 51, wherein said computer readable program code means for determining the optimized version of the missing portion of the event message stream includes computer readable program code means for using a shortest path graph search technique.

53. An article of manufacture comprising a computer useable medium having computer readable program code means embodied therein for an event message handling system in which a subscriber node receives an event message stream having a state defined by an event interpretation rule, the article of manufacture for preserving the state of the event message stream, comprising:

computer readable program code means for a node, other than the subscriber node, maintaining the event interpretation rule therein in preparation for providing an optimized event message stream to the subscriber node, the optimized event message stream sufficient to correctly update the first state, wherein the optimized event message stream is a relevant summary of the event message stream based on the event interpretation rule.

54. The article of manufacture of claim 53, wherein the sequencer node, or a plurality of sequencer nodes including the sequencer node, maintain a plurality of event interpretation rules therein for respective subscribers of a plurality of subscriber nodes each receiving respective event message streams, in preparation for providing respective, optimized event message streams to any one or more of the subscriber nodes.

* * * * *